United States Patent
Ito et al.

(10) Patent No.: US 10,158,127 B2
(45) Date of Patent: Dec. 18, 2018

(54) CELL FRAME FOR REDOX FLOW BATTERY, CELL STACK FOR REDOX FLOW BATTERY, AND REDOX FLOW BATTERY

(71) Applicant: Sumitomo Electric Industries, Ltd., Osaka-shi (JP)

(72) Inventors: Takefumi Ito, Osaka (JP); Takashi Kanno, Osaka (JP); Masahiro Kuwabara, Osaka (JP); Katsuya Yamanishi, Osaka (JP); Hideyuki Yamaguchi, Osaka (JP); Hayato Fujita, Osaka (JP); Kiyoaki Hayashi, Osaka (JP); Kousuke Shiraki, Osaka (JP); Kiyoaki Moriuchi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/124,483

(22) PCT Filed: Mar. 18, 2016

(86) PCT No.: PCT/JP2016/058751
§ 371 (c)(1),
(2) Date: Sep. 8, 2016

(87) PCT Pub. No.: WO2016/167077
PCT Pub. Date: Oct. 20, 2016

(65) Prior Publication Data
US 2017/0110741 A1 Apr. 20, 2017

(30) Foreign Application Priority Data
Apr. 14, 2015 (JP) .................. 2015-082781

(51) Int. Cl.
*H01M 8/0273* (2016.01)
*H01M 8/18* (2006.01)
(Continued)

(52) U.S. Cl.
CPC .......... *H01M 8/0273* (2013.01); *H01M 8/02* (2013.01); *H01M 8/0202* (2013.01); *H01M 8/18* (2013.01);
(Continued)

(58) Field of Classification Search
None
See application file for complete search history.

(56) References Cited

U.S. PATENT DOCUMENTS

| | | | |
|---|---|---|---|
| 2,225,800 A | 12/1940 | Rosenbloom | |
| 2,932,681 A | 4/1960 | Solomon | |

(Continued)

FOREIGN PATENT DOCUMENTS

| | | | |
|---|---|---|---|
| CA | 1153058 A | 8/1983 | |
| CN | 2862346 Y | 1/2007 | |

(Continued)

OTHER PUBLICATIONS

U.S. Appl. No. 15/117,630, filed Aug. 9, 2016.
(Continued)

*Primary Examiner* — Carmen V Lyles-Irving
(74) *Attorney, Agent, or Firm* — Venable LLP; Michael A. Sartori; Kerri M. Patterson

(57) ABSTRACT

A cell frame for a redox flow battery comprises: a bipolar plate; and a frame body provided at an outer periphery of the bipolar plate, the frame body including a manifold which penetrates through front and back surfaces of the frame body and through which an electrolyte flows, and at least one slit being formed on the front surface of the frame body and forming a channel of the electrolyte between the manifold (Continued)

and the bipolar plate, a cross sectional shape of the slit, in a longitudinal direction of the slit, having a width w and a depth h, the width w and the depth h satisfying (A) w≥3 mm and (B) 1/8<h/w<1.

6 Claims, 5 Drawing Sheets

(51) Int. Cl.
- *H01M 8/02* (2016.01)
- *H01M 8/0202* (2016.01)
- *H01M 8/20* (2006.01)
- *H01M 8/2465* (2016.01)
- *H01M 4/86* (2006.01)

(52) U.S. Cl.
CPC ............ *H01M 8/188* (2013.01); *H01M 8/20* (2013.01); *H01M 8/2465* (2013.01); *H01M 2004/8694* (2013.01); *Y02E 60/528* (2013.01)

(56) References Cited

U.S. PATENT DOCUMENTS

| | | | |
|---|---|---|---|
| 5,851,694 | A | 12/1998 | Miyabayashi et al. |
| 6,524,452 | B1 | 2/2003 | Clark et al. |
| 2012/0308911 | A1 | 12/2012 | Peled et al. |
| 2013/0037760 | A1* | 2/2013 | Maeda ................ H01M 8/0213 252/511 |
| 2013/0089767 | A1* | 4/2013 | Blacker ................ H01M 8/188 429/105 |
| 2014/0197605 | A1 | 7/2014 | Shimazoe et al. |
| 2014/0255815 | A1 | 9/2014 | Yano et al. |
| 2014/0363748 | A1 | 12/2014 | Kritzer et al. |

FOREIGN PATENT DOCUMENTS

| | | |
|---|---|---|
| CN | 101814618 A | 8/2010 |
| CN | 102082282 A | 6/2011 |
| CN | 102842730 A | 12/2012 |
| CN | 103035931 A | 4/2013 |
| CN | 103765058 A | 4/2014 |
| JP | 10-012261 A | 1/1998 |
| JP | 2002-246061 A | 8/2002 |
| JP | 2004-335158 A | 11/2004 |
| JP | 2013-080613 A | 5/2013 |
| JP | 2013-518362 A | 5/2013 |

OTHER PUBLICATIONS

International Search Report in International Application No. PCT/JP2016/058751 dated May 17, 2016.
Written Opinion of the International Searching Authority in International Application No. PCT/JP2016/058751 dated May 17, 2016.
International Search Report in International Application No. PCT/JP2015/073427, dated Nov. 24, 2015.
Written Opinion of the International Searching Authority in International Application No. PCT/JP2015/073427, dated Nov. 24, 2015.
Patent Examination Report No. 1 in Australian Patent Application No. 2015381015, dated Sep. 2, 2016.
Extended European Search Report in counterpart European Patent Application No. 158806717, dated Feb. 14, 2017.
U.S. Appl. No. 15/616,449, filed Jun. 7, 2017.
Notice of Allowance and Allowability in U.S. Appl. No. 15/117,630, dated May 4, 2017.
Notice of Allowance and Allowability in U.S. Appl. No. 15/616,449, dated Jun. 29, 2017 [Related application, provided in IFW].
Notice of Allowance in related U.S. Appl. No. 15/117,630, dated Jan. 20, 2017.
Office Action issued in U.S. Appl. No. 15/117,630, dated Oct. 6, 2017.
Office Action issued in U.S. Appl. No. 15/616,449, dated Oct. 16, 2017.
Office Action issued in U.S. Appl. No. 15/117,630, dated Mar. 5, 2018.
Office Action issued in U.S. Appl. No. 15/616,449, dated Mar. 2, 2018.
Office Action dated Jun. 29, 2018 in U.S. Appl. No. 15/616,449.
Advisory Action dated Jun. 14, 2018 issued in U.S. Appl. No. 15/117,630.
Office Action dated Jul. 26, 2018 issued in U.S. Appl. No. 15/117,630.

* cited by examiner

200:201~204
210:211~214

US 10,158,127 B2

CELL FRAME FOR REDOX FLOW BATTERY, CELL STACK FOR REDOX FLOW BATTERY, AND REDOX FLOW BATTERY

TECHNICAL FIELD

The present invention relates to a cell frame provided for a redox flow battery and serving as a component thereof, a cell stack provided for a redox flow battery and including the cell frame for the redox flow battery, and a redox flow battery including the cell stack for the redox flow battery. In particular, it relates to a cell frame provided for a redox flow battery, that is excellent in productivity, can be reduced in thickness, and can improve heat dissipation performance for an electrolyte and reduce the electrolyte's pressure loss.

BACKGROUND ART

As described in Japanese Patent Laying-Open No. 2013-080613 (patent document 1) and Japanese Patent Laying-Open No. 2002-246061 (patent document 2), as one large-capacity storage battery, a redox flow battery (hereafter also referred to as an "RF battery") is known. Referred to as applications of the redox flow battery are load leveling, as well as momentary drop compensation and backup power supply, and smoothing an output of natural energy such as solar power generation, wind power generation and the like whose massive introduction is prompted.

An RF battery is a battery which performs charging and discharging using as a positive electrode electrolyte and a negative electrode electrolyte an electrolyte containing a metal ion (an active material) having a valence varying by oxidation-reduction. FIG. 7 shows a principle of an operation of a vanadium-based RF battery 300 which uses as a positive electrode electrolyte and a negative electrode electrolyte a vanadium electrolyte containing a V ion. In FIG. 7 a solid line arrow and a broken line arrow in a battery cell 100 indicate a charging reaction and a discharging reaction, respectively.

RF battery 300 includes cell 100 separated into a positive electrode cell 102 and a negative electrode cell 103 by an ion exchange membrane 101 which permeates hydrogen ions. Positive electrode cell 102 has a positive electrode 104 incorporated therein, and a tank 106 provided for the positive electrode electrolyte and storing the positive electrode electrolyte is connected via conduits 108, 110 to positive electrode cell 102. Similarly, negative electrode cell 103 has a negative electrode 105 incorporated therein, and a tank 107 provided for the negative electrode electrolyte and storing the negative electrode electrolyte is connected via conduits 109, 111 to negative electrode cell 103. And by pumps 112, 113, the electrolyte stored in each tank 106, 107 is circulated and thus passed through cell 100 (positive electrode cell 102 and negative electrode cell 103) to perform charging and discharging.

In RF battery 300, normally, a configuration including a cell stack having a plurality of cells 100 stacked in layers is utilized. FIG. 8 is a schematic configuration diagram of a cell stack. A cell stack 10S is formed such that it is composed of a cell frame 20 including a frame body 22 and a bipolar plate 21 integrated therewith, positive electrode 104, ion exchange membrane 101, and negative electrode 105, each stacked in a plurality of layers, and this stack is sandwiched and thus clamped by two end plates 250s.

In cell stack 10S, positive electrode 104 is disposed at one surface side of bipolar plate 21 and negative electrode 105 is disposed at the other surface side of bipolar plate 21, and a single cell will be formed between adjacent cell frames 20. In cell stack 10S, an electrolyte is passed by a manifold 200 provided to penetrate frame body 22, and a slit 210 formed on a surface of frame body 22 between manifold 200 and bipolar plate 21. In cell stack 10S illustrated in FIG. 8, the positive electrode electrolyte is supplied from a liquid supply manifold 201 via a slit 211 that is formed on one surface side (corresponding to the front side of the sheet of the drawing) of frame body 22 to bipolar plate 21 on the side of positive electrode 104, and the positive electrode electrolyte is drained via a slit 213 that is formed at an upper portion of frame body 22 to a liquid drainage manifold 203. Similarly, the negative electrode electrolyte is supplied from a liquid supply manifold 202 via a slit 212 that is formed on the other surface side (corresponding to the back side of the sheet of the drawing) of frame body 22 to bipolar plate 21 on the side of negative electrode 105, and the negative electrode electrolyte is drained via a slit 214 that is formed at an upper portion of frame body 22 to a liquid drainage manifold 204. Furthermore, at a portion of frame body 22 where slits 211-214 are formed, a protective plate 30 made of plastic and protecting an ion exchange membrane 101 is disposed. Each protective plate 30 has a throughhole formed at a position corresponding to each manifold 201-204 and has a size to cover each slit 211-214. Slit 211-214 covered with protective plate 30 do not contact ion exchange membrane 101, and the ion exchange membrane can be prevented from being damaged by the irregularity of the slits.

CITATION LIST

Patent Documents

PTD 1: Japanese Patent Laying-Open No. 2013-080613
PTD 2: Japanese Patent Laying-Open No. 2002-246061

SUMMARY OF INVENTION

Technical Problem

In recent years, while large-scale natural energy power generation is being introduced, there is an increasing demand for an RF battery capable of storing a large amount of electric power. Accordingly, in view of reducing the cost of the RF battery, there is a demand for improving the productivity of a cell frame which is a component of the RF battery. The cell frame is generally formed by injection molding, and when taking its productivity into consideration, also forming a slit that is formed on the cell frame simultaneously by injection molding is desired. Furthermore, in view of miniaturizing the RF battery, there is also a demand for reducing in thickness a cell frame which configures a cell stack included in the RF battery.

In an RF battery, a shunt current flows via an electrolyte in a slit of a cell frame, and a loss by the shunt current (a shunt current loss) is caused. This shunt current results in the electrolyte generating heat and having increased temperature, which may soften and deform the cell frame and thus damage it. Accordingly, in order to suppress rise of the temperature of the electrolyte in the slit, a cell frame that can improve the heat dissipation performance for the electrolyte is desired. Furthermore, a cell frame which can reduce a pressure loss of an electrolyte which flows through the slit of the cell frame is desired.

A conventional cell frame generally has a slit having a cross sectional shape such that the slit has a width w and a depth h having a dimensional ratio substantially equal to one (h≈w) and thus has a substantially square cross sectional shape. Conventionally, what cross sectional shape a slit of a cell frame should have has not been sufficiently examined from a viewpoint of improving the heat dissipation performance for the electrolyte and reducing its pressure loss. Furthermore, conventionally, a square shape has been adopted for a slit's cross sectional shape, and when the slit is increased in cross-sectional area it is also increased in depth, which entails increasing the cell frame's thickness. This serves a factor of increasing a cell stack's size.

The present invention has been made in view of the above circumstances, and one object of the present invention is to provide a cell frame provided for a redox flow battery, that is excellent in productivity, can be reduced in thickness, and can improve heat dissipation performance for an electrolyte and reduce the electrolyte's pressure loss. Furthermore, another object is to provide a cell stack provided for a redox flow battery and including the cell frame for the redox flow battery as described above. Still another object is to provide a redox flow battery including the cell stack for the redox flow battery as described above.

Solution to Problem

A cell frame for a redox flow battery according to one aspect of the present invention is a cell frame comprising: a bipolar plate; and a frame body provided at an outer periphery of the bipolar plate. The frame body includes a manifold which penetrates through front and back surfaces of the frame body and through which an electrolyte flows, and at least one slit being formed on the front surface of the frame body and forming a channel of the electrolyte between the manifold and the bipolar plate. A cross sectional shape of the slit, in a longitudinal direction of the slit, has a width w and a depth h, the width w and the depth h satisfying (A) w≥3 mm and (B) 1/8<h/w<1.

A cell stack for a redox flow battery according to one aspect of the present invention is a cell stack formed such that it is composed of a cell frame having a bipolar plate, a positive electrode, an ion exchange membrane, and a negative electrode, stacked in a plurality of layers. And this cell stack includes as said cell frame the cell frame for a redox flow battery according to one aspect of the present invention as described above.

A redox flow battery according to one aspect of the present invention comprises a cell stack for a redox flow battery according to one aspect of the present invention as described above.

Advantageous Effect of Invention

The above cell frame for the redox flow battery is excellent in productivity, can be reduced in thickness, and can improve the heat dissipation performance for the electrolyte and reduce the electrolyte's pressure loss. The above cell frame for a redox flow battery, and redox flow battery can be miniaturized and improve the heat dissipation performance for the electrolyte and reduce the electrolyte's pressure loss.

DESCRIPTION OF EMBODIMENTS

Figure 1:
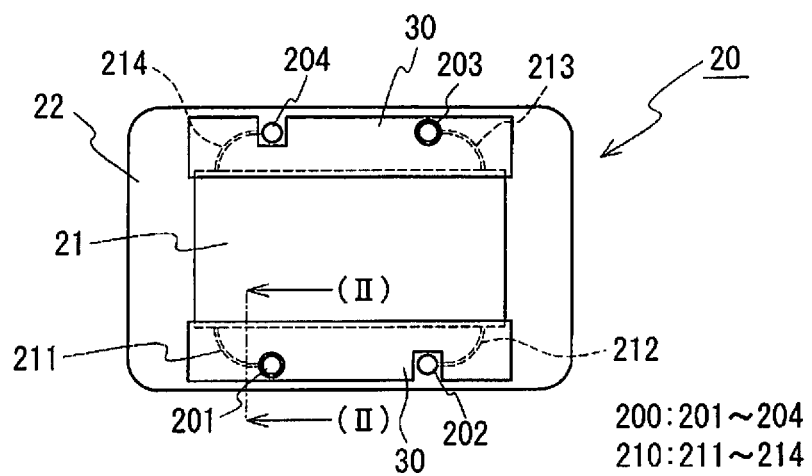
FIG. 1 is a schematic front view of a cell frame according to a first embodiment.

Description of Embodiments of the Present Invention

Initially, embodiments of the present invention will be enumerated and described.

(1) A cell frame for a redox flow battery according to one aspect of the present invention is a cell frame comprising: a bipolar plate; and a frame body provided at an outer periphery of the bipolar plate. The frame body includes a manifold which penetrates through front and back surfaces of the frame body and through which an electrolyte flows, and at least one slit being formed on the front surface of the frame body and forming a channel of the electrolyte between the manifold and the bipolar plate. A cross sectional shape of the slit, in a longitudinal direction of the slit, has a width w and a depth h, the width w and the depth h satisfying (A) w≥3 mm and (B) 1/8<h/w<1.

According to the above cell frame, the slit has a cross sectional shape satisfying requirement (A), i.e., w≥3 mm, and the slit thus has a width of 3 mm or more, so that when the cell frame is formed by injection molding, the slit can be easily formed simultaneously. Accordingly, the cell frame is excellent in productivity. When the width of the slit is less than 3 mm, it is difficult to form the slit by injection molding with precision. The above cell frame has a slit having a cross sectional shape satisfying requirement (B), i.e., 1/8<h/w<1 (i.e., h<w and h>w/8). As h/w<1 (that is, h<w) is satisfied, the slit has a wide (or laterally long) cross sectional shape. When the slit having a laterally long cross sectional shape is compared with a slit having a conventional square shape and the same cross-sectional area, the former is less deep than the latter and thus allows the cell frame to be reduced in thickness. This allows the cell frame to have a reduced thickness, and a cell stack to be miniaturized, and hence a redox flow battery to be miniaturized. h/w having a smaller value allows a slit to have a flatter cross sectional shape and hence a smaller depth.

A cell frame having a slit with a smaller cross-sectional area and a longer slit length increases the electrolyte's electrical resistance in the slit and decreases the amount of heat caused by a shunt current. Furthermore, a slit having a larger surface area provides an increased heat dissipation area, and thus increases the heat dissipation performance for the electrolyte. Accordingly, for a given slit length, a slit having a longer wetted perimeter length (or a longer perimeter in cross section) has a larger surface area and thus improves the heat dissipation performance for the electrolyte. That is, in view of the heat dissipation performance for the electrolyte, it is preferable that the perimeter be long relative to the cross-sectional area. As the slit has a cross sectional shape satisfying h<w, it has a laterally long cross sectional shape, and when the slit is compared with a slit having a conventional square shape and the same cross-sectional area, the former can have a perimeter longer than the latter and can thus improve the heat dissipation performance for the electrolyte. h/w having a smaller value allows a slit to have a longer perimeter. In contrast, a smaller pressure loss is achieved by a larger cross sectional area and a shorter perimeter, and accordingly, when pressure loss is considered, it can be minimized when the slit has a square cross sectional shape. A slit having a cross sectional shape satisfying h/w>1/8 can prevent a perimeter from being excessively large and thus prevent pressure loss from being excessively large. Thus, reduction in pressure loss can be achieved for a given cross sectional slit area. Thus the above cell frame satisfying requirements (A) and (B) can establish both improvement in heat dissipation performance of an electrolyte and reduction in pressure loss thereof while the cell frame is excellent in productivity and can also be reduced in thickness.

The cross sectional shape of the slit, as referred to herein, means a shape thereof in a cross section orthogonal to the slit's longitudinal direction (i.e., a direction in which the electrolyte flows). Furthermore, the width of the slit means an average value in width in cross section and the depth of the slit means an average value in depth in cross section.

(2) As one aspect of a cell frame for a redox flow battery as described above, the above slit has a cross sectional shape satisfying (C) w≤8 mm.

As the slit has a cross sectional shape satisfying requirement (C), i.e., w≤8 mm, the slit has a width of 8 mm or less, and a protective plate disposed to cover the slit can be prevented from fall in to the slit.

(3) As one aspect of a cell frame for a redox flow battery as described above for item (2), furthermore, the above slit has a cross sectional shape satisfying (D) h≤5 mm.

As the slit has a cross sectional shape satisfying requirement (D), i.e., h≤5 mm, the slit has a depth of 5 mm or less, and the cell frame can thus be reduced in thickness.

(4) As one aspect of a cell frame for a redox flow battery as described above for item (3), furthermore, the above slit has a cross sectional shape satisfying (E) h/w≤3/5.

The slit having a cross sectional shape satisfying requirement (E), i.e., h/w≤3/5 (i.e., h≤3 w/5) ensures the perimeter to some extent to be able to further improve the heat dissipation performance for the electrolyte. Furthermore, the slit can have a flat cross sectional shape and hence a small depth, and the cell frame can thus be reduced in thickness.

(5) A cell stack for a redox flow battery according to one aspect of the present invention is a cell stack formed such that it is composed of a cell frame having a bipolar plate, a positive electrode, an ion exchange membrane, and a negative electrode, stacked in a plurality of layers. And this cell stack includes as said cell frame the cell frame for a redox flow battery according to any one of those described above for items (1) to (4).

The above cell stack that has a cell frame for a redox flow battery according to one aspect of the present invention can be miniaturized (or reduced in thickness) and allows the heat dissipation performance for the electrolyte to be improved and its pressure loss to be reduced.

(6) A redox flow battery according to one aspect of the present invention comprises a cell stack for a redox flow battery according to the above item (5).

The above redox flow battery that comprises a cell stack for a redox flow battery according to one aspect of the present invention can be miniaturized and allows the heat dissipation performance for the electrolyte to be improved and its pressure loss to be reduced.

DETAILED DESCRIPTION OF EMBODIMENTS OF THE PRESENT INVENTION

Figure 7:
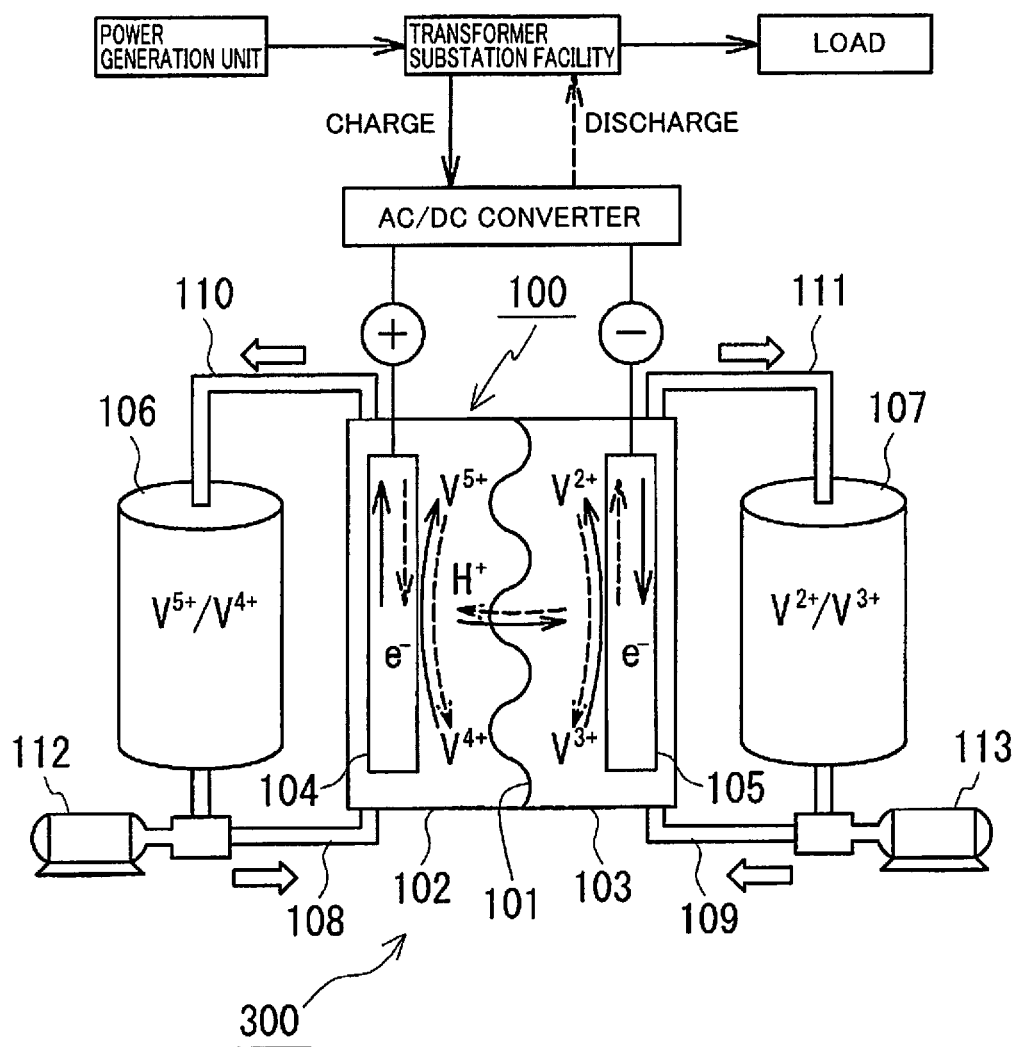
FIG. 7 shows a principle of an operation of a redox flow battery.
Figure 8:
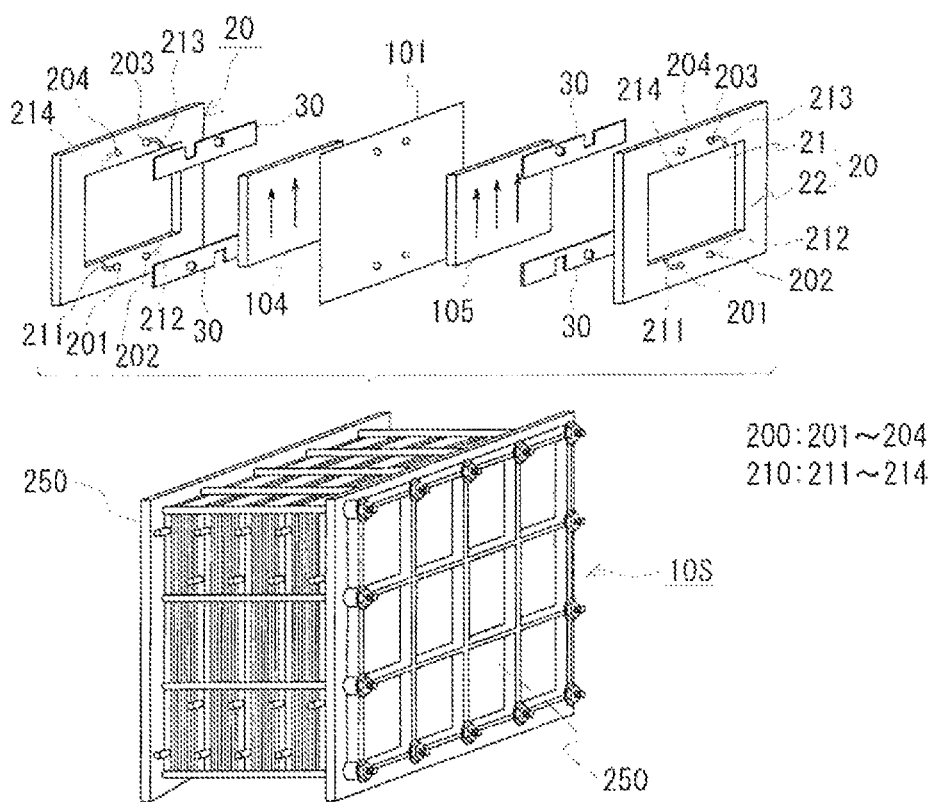
FIG. 8 is a schematic configuration diagram of a cell stack.

Hereinafter will be described a cell frame, a cell stack, and a redox flow battery according to an embodiment of the present invention in a specific example. The cell stack and redox flow battery according to the embodiment of the present invention is characterized by a cross sectional shape of a slit of a cell frame, and the remainder in configuration is identical to the conventional cell stack and redox flow battery described with reference to FIG. 7 and FIG. 8. Accordingly, hereinafter, the cell frame according to the embodiment of the present invention will be described with reference to the drawings, and any configuration similar to the conventional configuration will be denoted with reference characters identical to those indicated in FIG. 7 and FIG. 8, and will not be described. Note that the present invention is not limited to these examples, and is intended to include any modifications within the meaning and scope indicated by and equivalent to the terms of the claims.

FIG. 1 shows a cell frame 20 having a frame body 22 provided at an outer periphery of a bipolar plate 21, and frame body 22 is integrated with the outer periphery of bipolar plate 21 by injection molding or the like. Frame body 22 includes a manifold 200 (manifolds 201-204) which penetrates the front and back sides of the frame body and passes an electrolyte, and a slit 210 (slits 211-214) which is formed on a surface of the frame body and forms a channel between each manifold 201-204 and bipolar plate 21 for the electrolyte. Slits 211, 213 are formed on frame body 22 at one surface side (corresponding to the front side of the sheet of the drawing) and slits 212, 214 are formed on frame body 22 at the other surface side (corresponding to the back side of the sheet of the drawing). Furthermore, on cell frame 20, on one side surface of frame body 22 where slits 211 and 213 are formed, a protective plate 30 is disposed to cover slits 211 and 213. Although not shown in the figure, there is also a protective plate disposed on the other surface side of frame body 22 to cover slits 212, 214.

Frame body 22 configuring cell frame 20 is formed for example of vinyl chloride resin, polypropylene, polyethylene, fluoro-resin, epoxy resin or other similar plastics or rubbers, or the like. Bipolar plate 21 can be formed of plastic carbon.

Frame body 22 is integrated with bipolar plate 21 to sandwich an outer edge portion of bipolar plate 21 from the front and back sides. Accordingly, frame body 22 is thicker than bipolar plate 21, and a stepped surface is formed at a boundary of frame body 22 and bipolar plate 21. Along this stepped surface, a positive electrode (see FIG. 8) is disposed at one surface side of bipolar plate 21 and a negative electrode (see FIG. 8) is disposed at the other surface side of bipolar plate 21. Cell frame 20 (frame body 22) has a thickness for example of 2 mm or more and 10 mm or less.

Slit 210 has one end connected to manifold 200, and the other end connected to the stepped surface at frame body 22 with bipolar plate 21. Frame body 22 is formed of four sides, of which, normally, a side provided with manifold 200 has an inner edge portion provided with a flow adjustment portion, and slit 210 has the other end connected to the flow adjustment portion. The flow adjustment portion has a function which diffuses the electrolyte that is supplied from slit 210 along an edge portion an electrode, and collects the electrolyte that is drained from an electrode to slit 210.

Figure 2:
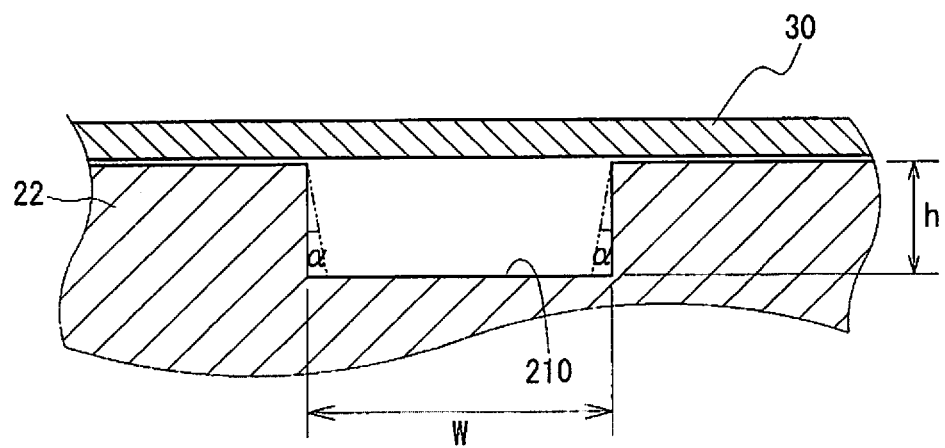
FIG. 2 is a schematic cross section showing a cross sectional shape of a slit in the frame body according to the first embodiment.

FIG. 2 shows a cross sectional shape of slit 210 along a line II-II of FIG. 1. Slit 210 has a rectangular cross sectional shape, and when the slit's width is represented as w and the slit's depth is represented as h, it satisfies the following requirements (A) and (B):

(A) w≥3 mm; and (B) 1/8<h/w<1 (i.e., h<w and h>w/8).

By satisfying the above requirement (A), slit 210 has a width of 3 mm or more, and when cell frame 20 is formed by injection molding, slit 210 can be formed with precision.

By satisfying the above requirement (B), h<w, and accordingly, slit 210 has a wide (or laterally long) cross sectional shape. When slit 210 having a laterally long cross sectional shape is compared with a slit having a conventional square shape and the same cross-sectional area as slit 210, the former is less deep than the latter and thus allows cell frame 20 to be reduced in thickness. h/w having a smaller value allows a slit to have a flatter cross sectional shape and be less deep and thus allows cell frame 20 to be further reduced in thickness.

Furthermore, by satisfying the above requirement (B), slit 210 has a laterally long (i.e., h<w) cross sectional shape, and when slit 210 is compared with a slit having a conventional square shape and the same cross-sectional area as slit 210, the former can have a perimeter longer than the latter and can thus improve the heat dissipation performance for the electrolyte. h/w having a smaller value allows slit 210 to have a longer perimeter and thus further improves the heat dissipation performance for the electrolyte. The perimeter of slit 210 is calculable as a sum in length of the cross sectional shape's upper side (a side at the opening of the slit) and lower side (a side at the bottom surface), and right and left, lateral sides (sides along the depthwise direction), and when the cross sectional shape is a rectangular shape, the perimeter will be (w+h)×2. Furthermore, since slit 210 has a cross sectional shape satisfying h>w/8, it can sufficiently reduce pressure loss for a given cross-sectional area. h≤8/w provides an excessive perimeter resulting in an excessive pressure loss. Slit 210 having a cross sectional shape satisfying h>w/8 allows pressure loss to be suppressed to 2.5 times or less of that provided via a square slit having the same cross-sectional area.

Figure 3:
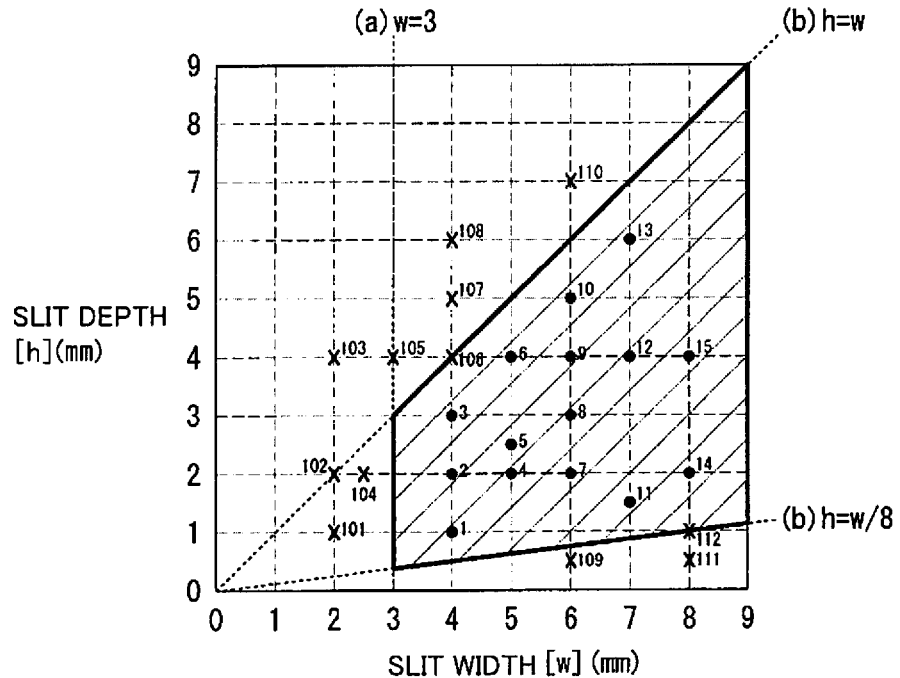
FIG. 3 is a graph showing a range in which the cell frame according to the first embodiment has a slit having a cross sectional shape satisfying requirements (A) and (B).

FIG. 3 is a graph having an axis of abscissa representing a slit's width (in mm) and an axis of ordinate representing the slit's depth (in mm), showing a range in which the slit's cross sectional shape satisfies the requirements (A) and (B). FIG. 3 shows a hatched portion, which indicates the range satisfying the requirements (A) and (B).

It is preferable that the cross sectional shape of slit 210 satisfy the requirements (A) and (B) and in addition, the following requirement (C):

(C) w≤8 mm.

By satisfying the above requirement (C), slit 210 has a width of 8 mm less, and can prevent protective plate 30 from fall in to slit 210.

Figure 4:
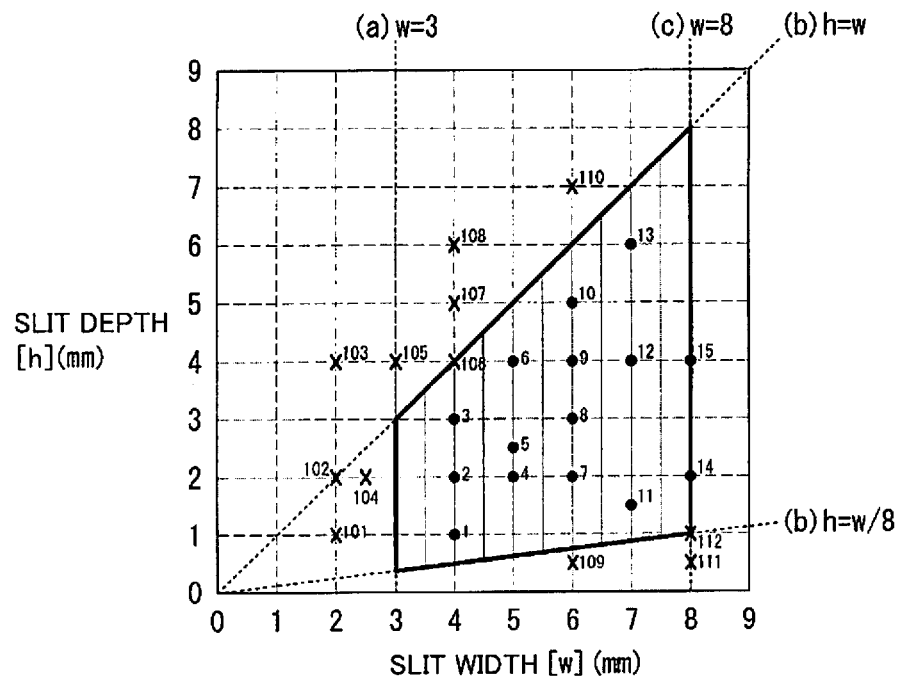
FIG. 4 is a graph showing a range in which the cell frame according to the first embodiment has a slit having a cross sectional shape satisfying requirements (A) to (C).

FIG. 4 is a graph having an axis of abscissa representing a slit's width (in mm) and an axis of ordinate representing the slit's depth (in mm), showing a range in which the slit's cross sectional shape satisfies all of the requirements (A) to (C). FIG. 4 shows a hatched portion, which indicates the range satisfying the requirements (A) to (C).

Furthermore, it is preferable that the cross sectional shape of slit 210 satisfy the requirements (A) to (C) and in addition, the following requirement (D):

(D) h≤5 mm.

By satisfying the above requirement (D), slit 210 has a depth of 5 mm less, and cell frame 20 can be reduced in thickness.

Figure 5:
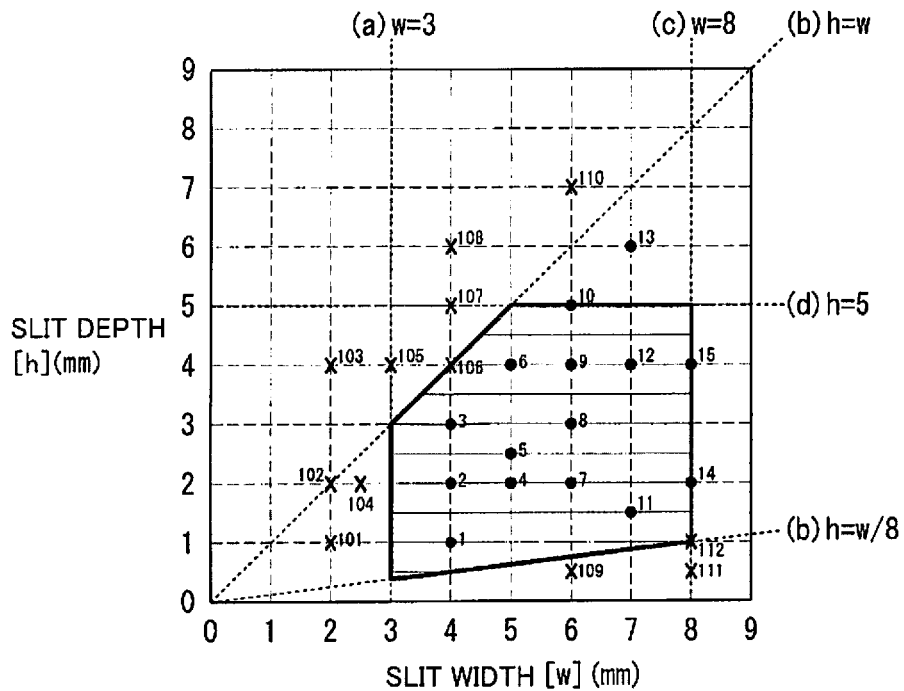
FIG. 5 is a graph showing a range in which the cell frame according to the first embodiment has a slit having a cross sectional shape satisfying requirements (A) to (D).

FIG. 5 is a graph having an axis of abscissa representing a slit's width (in mm) and an axis of ordinate representing the slit's depth (in mm), showing a range in which the slit's cross sectional shape satisfies all of the requirements (A) to (D). FIG. 5 shows a hatched portion, which indicates the range satisfying the requirements (A) to (D).

Furthermore, it is preferable that the cross sectional shape of slit 210 satisfy the requirements (A) to (D) and in addition, the following requirement (E):

(E) h/w≤3/5.

By satisfying the above requirement (E), the perimeter can be long to some extent, and the heat dissipation performance for the electrolyte can further be improved. Furthermore, slit 210 can have a flat cross sectional shape and hence a small depth, and cell frame 20 can thus be reduced in thickness.

Figure 6:
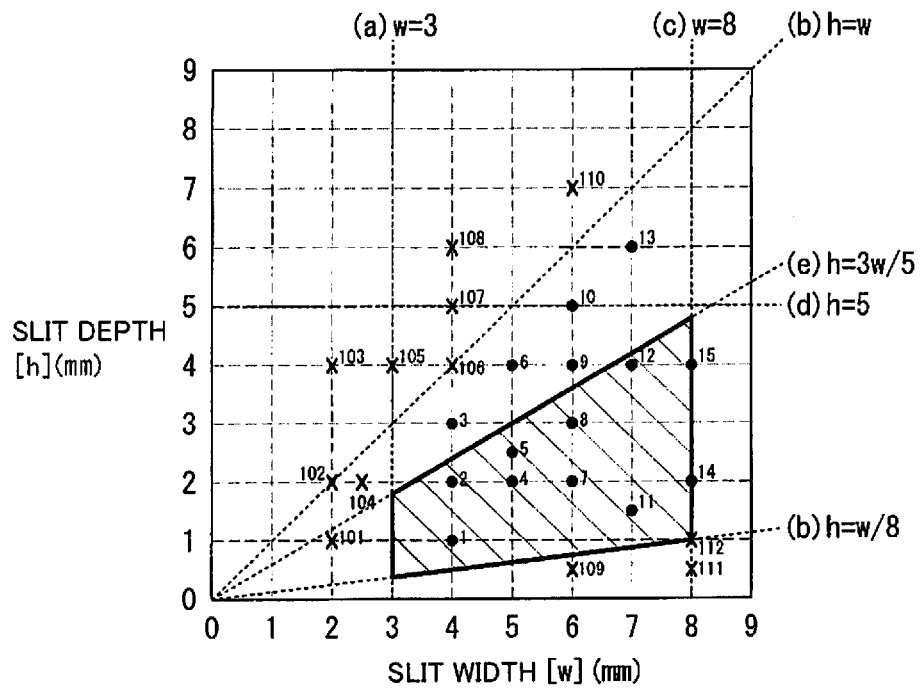
FIG. 6 is a graph showing a range in which the cell frame according to the first embodiment has a slit having a cross sectional shape satisfying requirements (A) to (E).

FIG. 6 is a graph having an axis of abscissa representing a slit's width (in mm) and an axis of ordinate representing the slit's depth (in mm), showing a range in which the slit's cross sectional shape satisfies all of the requirements (A) to (E). FIG. 6 shows a hatched portion, which indicates the range satisfying the requirements (A) to (E).

(Others)

While the first embodiment has been described with reference to an example in which slit 210 has a rectangular cross sectional shape, the slit's cross sectional shape is not necessary a rectangular shape, and it may for example be a quadrangle such as a trapezoid, a triangle such as an isosceles triangle, a semicircle, a semiellipse, or the like. Furthermore, while in the first embodiment a single slit 210 is formed for a single manifold 200, there may be provided a plurality of slits.

In the cross sectional shape of slit 210 shown in FIG. 2, at least one of the lateral sides along the depthwise direction may be tapered. In that case, a taper angle α (an angle which a lateral side forms with respect to a line perpendicular to a surface of frame body 22) is for example 5 degrees or more and 15 degrees or less. A lateral side and the lower side may form a round corner. In that case, the corner's radius of curvature r is set for example to 0.2 mm or more and 0.8 mm or less, furthermore, 0.4 mm or more and 0.6 mm or less. A tapered lateral side; a lateral side and the lower side forming a round corner; and the like facilitate forming the slit by injection molding.

Example 1

Cell frames each having a slit formed to be different in width w and depth h were assessed for heat dissipation performance, pressure loss, and its thickness.

(Size of Slit)

Each slit had a rectangular cross sectional shape and cell frames having slits formed to have widths w and depths h as indicated in table 1 were assumed and denoted as samples Nos. 1-15 and Nos. 101-112. Furthermore, the slits of samples Nos. 1-15 and Nos. 101-112 shown in table 1 were plotted on the graphs of FIG. 3 to FIG. 6.

From width w and depth h of each slit indicated in table 1, the slit's perimeter and cross-sectional area were calculated by the following expression:

Perimeter 1(in mm): 1=2(w+h), and

Cross-sectional area S(in mm): S=w×h.

Furthermore, the slit had a length L set to 100 mm and each slit's surface area was calculated by the following expression:

Surface area $A(cm^2)$: $A = l \times L$.

Calculated perimeter 1, cross-sectional area S, length L, and surface area A are shown in table 1.

(Electric Resistance of Electrolyte in Slit)

In obtaining heat dissipation performance, initially, the electrolyte's electrical resistance R in each slit was calculated by the following expression. Note that the electrolyte's specific resistance p was set to 2.07 Ωcm.

Electrical resistance $R(k\Omega) = \rho \times L/l$ (Amount of Heat by Shunt Current)

Then, from the above electrical resistance R, an amount of heat Q by a shunt current within each slit was calculated by the following expression. Note that the number N of cells stacked in layers was 100 and electromotive force E per cell was set to 1.48 V/cell.

Amount of Heat $Q(W) = (V/2)^2/R$ (V: cells' overall voltage, $V = E \times N$)

(Heat Dissipation Performance)

Based on the above surface area A and amount of heat Q, the heat dissipation performance for the electrolyte C by each slit was calculated by the following expression:

Heat dissipation performance $C(W/cm^2) = Q/A$.

Calculated electrical resistance R, amount of heat Q, and heat dissipation performance C are shown in table 1. Heat dissipation performance C having a smaller value can be said to be excellent heat dissipation performance.

(Pressure Loss)

Length L of the slit was set to 100 mm and, based on the above perimeter 1 and cross-sectional area S, the electrolyte's pressure loss ΔP in each slit was calculated by the following expression. Note that the electrolyte had a kinematic viscosity ν of 3.5295 mm²/second, a specific gravity ρh of 1.37 kg/liter, and a flow rate q of 0.083 liter/minute per slit.

Pressure Loss $\Delta P(Pa) = 2 \times L \times v \times q \times \rho h \times 1^2 / S^3$.

Calculated pressure loss ΔP is indicated in table 1.

(Thickness of Cell Frame)

From depth h of a slit, a possible minimal thickness Tn of a cell frame was obtained as an index of how much the cell frame can be reduced in thickness. The cell frame's possible minimal thickness Tn was calculated as the slit's depth h plus a thickness of 1.3 mm. A result thereof is shown in table 1.

TABLE 1

| | slit | | | | | | heat | | | |
|---|---|---|---|---|---|---|---|---|---|---|
| sample Nos. | width W (mm) | depth h (mm) | perimeter l (mm) | cross section S (mm²) | length L (mm) | surface area A (cm²) | resistance R (kΩ) | amount of heat Q (W) | dissipation performance C (W/cm²) | pressure loss ΔP (Pa) | frame thickness Tn (mm) |
| 1 | 4 | 1 | 10 | 4 | 100 | 10 | 0.518 | 10.58 | 1.06 | 2098.7 | 2.3 |
| 2 | 4 | 2 | 12 | 8 | 100 | 12 | 0.259 | 21.16 | 1.76 | 377.8 | 3.3 |
| 3 | 4 | 3 | 14 | 12 | 100 | 14 | 0.173 | 31.74 | 2.27 | 152.4 | 4.3 |
| 4 | 5 | 2 | 14 | 10 | 100 | 14 | 0.207 | 26.45 | 1.89 | 263.3 | 3.3 |
| 5 | 5 | 2.5 | 15 | 12.5 | 100 | 15 | 0.166 | 33.07 | 2.20 | 154.7 | 3.8 |
| 6 | 5 | 4 | 18 | 20 | 100 | 18 | 0.104 | 52.91 | 2.94 | 54.4 | 5.3 |
| 7 | 6 | 2 | 16 | 12 | 100 | 16 | 0.173 | 31.74 | 1.98 | 199.0 | 3.3 |
| 8 | 6 | 3 | 18 | 18 | 100 | 18 | 0.115 | 47.62 | 2.65 | 74.6 | 4.3 |
| 9 | 6 | 4 | 20 | 24 | 100 | 20 | 0.086 | 63.49 | 3.17 | 38.9 | 5.3 |
| 10 | 6 | 5 | 22 | 30 | 100 | 22 | 0.069 | 79.36 | 3.61 | 24.1 | 6.3 |
| 11 | 7 | 1.5 | 17 | 10.5 | 100 | 17 | 0.197 | 27.78 | 1.63 | 335.3 | 2.8 |
| 12 | 7 | 4 | 22 | 28 | 100 | 22 | 0.074 | 74.07 | 3.37 | 29.6 | 5.3 |
| 13 | 7 | 6 | 26 | 42 | 100 | 26 | 0.049 | 111.11 | 4.27 | 12.3 | 7.3 |
| 14 | 8 | 2 | 20 | 16 | 100 | 20 | 0.129 | 42.33 | 2.12 | 131.2 | 3.3 |
| 15 | 8 | 4 | 24 | 32 | 100 | 24 | 0.065 | 84.65 | 3.53 | 23.6 | 5.3 |
| 101 | 2 | 1 | 6 | 2 | 100 | 6 | 1.035 | 5.29 | 0.88 | 6044.3 | 2.3 |
| 102 | 2 | 2 | 8 | 4 | 100 | 8 | 0.518 | 10.58 | 1.32 | 1343.2 | 3.3 |
| 103 | 2 | 4 | 12 | 8 | 100 | 12 | 0.259 | 21.16 | 1.76 | 377.8 | 5.3 |
| 104 | 2.5 | 2 | 9 | 5 | 100 | 9 | 0.414 | 13.23 | 1.47 | 870.4 | 3.3 |
| 105 | 3 | 4 | 14 | 12 | 100 | 14 | 0.173 | 31.74 | 2.27 | 152.4 | 5.3 |
| 106 | 4 | 4 | 16 | 16 | 100 | 16 | 0.129 | 42.33 | 2.65 | 83.9 | 5.3 |
| 107 | 4 | 5 | 18 | 20 | 100 | 18 | 0.104 | 52.91 | 2.94 | 54.4 | 6.3 |
| 108 | 4 | 6 | 20 | 24 | 100 | 20 | 0.086 | 63.49 | 3.17 | 38.9 | 7.3 |
| 109 | 6 | 0.5 | 13 | 3 | 100 | 13 | 0.690 | 7.94 | 0.61 | 8407.3 | 1.8 |
| 110 | 6 | 7 | 26 | 42 | 100 | 26 | 0.049 | 111.11 | 4.27 | 12.3 | 8.3 |
| 111 | 8 | 0.5 | 17 | 4 | 100 | 17 | 0.518 | 10.58 | 0.62 | 6065.3 | 1.8 |
| 112 | 8 | 1 | 18 | 8 | 100 | 18 | 0.259 | 21.16 | 1.18 | 850.0 | 2.3 |

Samples Nos. 1-15 indicated in table 1 had a slit having a cross sectional shape satisfying (A) w≥3 mm, and as the slit has a width of 3 mm or more, the cell frame can be formed by injection molding, with the slit formed with precision. In contrast, samples Nos. 101-104 had a slit having a width less than 3 mm and it is thus difficult to form the slit by injection molding with precision. Furthermore, samples Nos. 1-15 satisfy (C) w≤8 mm, and as the slit has a width of 8 mm less, the protective plate disposed to cover the slit can be prevented from fall in to the slit.

Samples Nos. 1-15 had a slit having a cross sectional shape satisfying (B) 1/8<h/w<1, and as h<w, the slit has a laterally long cross sectional shape, and the cell frame can be reduced in thickness. When samples Nos. 1 to 15 and samples Nos. 101 to 112 are compared that are equal in cross-sectional area, more specifically, when No. 1 and No. 102; No. 2 and No. 103; No. 6 and No. 107; No. 7 and No.

105; No. 9 and No. 108; No. 13 and No. 110; and No. 14 and No. 106 are compared the former samples, which satisfy h<w, allow a cell frame to have possible minimal thickness Tn having a smaller value and hence be reduced in thickness. In particular, samples Nos. 1-15 excluding sample No. 13 satisfy (D) h≤5 mm, and, as the samples have a slit having a depth of 5 mm or less, the samples allow a cell frame to have possible minimal thickness Tn having an absolutely small value. The cell frame can thus be reduced in thickness.

Furthermore, samples Nos. 1-15 having a slit with a laterally long (i.e., h<w) cross sectional shape allow the slit to have a long perimeter, and can thus improve the heat dissipation performance for the electrolyte. Of samples Nos. 1 to 15, when samples Nos. 1 and 14 are compared with samples Nos. 102 and 106 being equal in cross-sectional area to samples Nos. 1 and 14 and having a square cross sectional shape, respectively, samples Nos. 1 and 14, which satisfy h<w, allow smaller heat dissipation performance C and are thus excellent in heat dissipation performance. In particular, of samples Nos. 1-15, samples which satisfy (E) h/w≤3/5, such as Nos. 1, 2, 4, 5, 7, 8, 11, 12, 14, and 15, are flatter and long in perimeter. Thus the heat dissipation performance for the electrolyte can further be improved. For example when Nos. 3 and 7, which are equal in cross-sectional area, are compared, sample No. 7, which satisfies h/w≤3/5, allows smaller heat dissipation performance C and is thus satisfactory in heat dissipation performance.

Furthermore, samples Nos. 1-15, having a slit having a cross sectional shape satisfying h>w/8, can sufficiently reduce pressure loss. For example, when samples Nos. 1 and 14 are compared with samples Nos. 102 and 106 being equal in cross-sectional area to samples Nos. 1 and 14 and having a square cross sectional shape, respectively, samples Nos. 1 and 14 provide pressure loss ΔP of 2.5 times or less of pressure loss ΔP of samples Nos. 102 and 106. On the other hand, samples Nos. 109, 111, 112, which do not satisfy h>w/8, provide excessive pressure loss and cannot reduce pressure loss sufficiently.

INDUSTRIAL APPLICABILITY

A cell frame for a redox flow battery of the present invention is suitably applicable to a component of a cell stack for a redox flow battery and that of a redox flow battery.

REFERENCE SIGNS LIST

100: cell; 101: ion exchange membrane; 102: positive electrode cell; 104: positive electrode; 103: negative electrode cell; 105: negative electrode; 106: tank for positive electrode electrolyte; 108, 110: conduit; 112: pump; 107: tank for negative electrode electrolyte; 109, 111: conduit; 113: pump; 20: cell frame; 21: bipolar plate; 22: frame body; 200, 201-204: manifold; 210, 211-214: slit; 30: protective plate; 10S: cell stack; 250: end plate; 300: redox flow battery (RF battery).

The invention claimed is:

1. A cell frame for a redox flow battery, comprising:
   a frame body having a front surface, a back surface, and an opening penetrating the frame body in a direction from the front surface to the back surface; and
   a bipolar plate fitted to the opening,
   the frame body including a manifold which penetrates through the front and back surfaces of the frame body and through which an electrolyte flows, and at least one slit being formed on the front surface of the frame body and forming a channel of the electrolyte between the manifold and the bipolar plate,
   a cross sectional shape of the slit in a cross section orthogonal to a direction in which the electrolyte flows, having a width w and a depth h, the width w and the depth h satisfying (A) w≥3 mm and (B) 1/8<h/w<1, and
   a protective plate disposed on the front surface to cover the slit, the protective plate having at least one through-hole aligned with the manifold.

2. The cell frame for a redox flow battery according to claim 1, wherein the slit's cross sectional shape satisfies (C) w≤8 mm.

3. The cell frame for a redox flow battery according to claim 2, wherein the slit's cross sectional shape further satisfies (D) h≤5 mm.

4. The cell frame for a redox flow battery according to claim 3, wherein the slit's cross sectional shape further satisfies (E) h/w≤3/5.

5. A cell stack provided for a redox flow battery and formed such that it is composed of a cell frame having the bipolar plate, a positive electrode, an ion exchange membrane, and a negative electrode, stacked in a plurality of layers, the cell stack comprising as the cell frame the cell frame for a redox flow battery according to claim 1.

6. A redox flow battery comprising the cell stack for a redox flow battery according to claim 5.

* * * * *